(12) United States Patent
Johnston

(10) Patent No.: US 11,023,687 B2
(45) Date of Patent: Jun. 1, 2021

(54) SYSTEM AND METHOD FOR SENTIMENT ANALYSIS OF CHAT GHOST TYPING

(71) Applicant: Verint Americas Inc., Alpharetta, GA (US)

(72) Inventor: Michael Johnston, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 157 days.

(21) Appl. No.: 16/154,328

(22) Filed: Oct. 8, 2018

(65) Prior Publication Data

US 2020/0110799 A1    Apr. 9, 2020

(51) Int. Cl.
G06F 40/35   (2020.01)
G06Q 30/00   (2012.01)
H04L 29/06   (2006.01)

(52) U.S. Cl.
CPC ........... G06F 40/35 (2020.01); G06Q 30/016 (2013.01); H04L 65/1096 (2013.01)

(58) Field of Classification Search
CPC ......... G09B 5/06; H04L 51/10; G06F 17/279; G16H 10/60
See application file for complete search history.

(56) References Cited

U.S. PATENT DOCUMENTS

| | | | | |
|---|---|---|---|---|
| 8,346,563 | B1 * | 1/2013 | Hjelm | G10L 15/1822 379/88.01 |
| 8,706,689 | B1 * | 4/2014 | Adam | G06Q 10/101 707/616 |
| 10,104,427 | B1 * | 10/2018 | Zabetian | H04N 21/4627 |
| 10,135,989 | B1 * | 11/2018 | Indyk | H04M 3/42068 |
| 10,469,275 | B1 * | 11/2019 | Broomall | G06F 40/205 |
| 10,579,742 | B1 * | 3/2020 | Fernandez | A61B 5/0002 |
| 2002/0007276 | A1 * | 1/2002 | Rosenblatt | G06Q 30/02 704/260 |
| 2004/0249650 | A1 * | 12/2004 | Freedman | G06Q 30/02 705/7.29 |
| 2005/0065803 | A1 * | 3/2005 | Creamer | G06F 11/3476 717/127 |
| 2005/0065994 | A1 * | 3/2005 | Creamer | G06F 9/5072 709/202 |
| 2006/0069733 | A1 * | 3/2006 | Antonoff | H04L 67/28 709/206 |

(Continued)

*Primary Examiner* — Anne L Thomas-Homescu
(74) *Attorney, Agent, or Firm* — Christopher M. Scherer; DeWitt LLP

(57) ABSTRACT

The present invention allows for the capture and sentiment analysis of text the customer inputs into a chat, but never actually sends to the customer service representative (ghost text). The system captures this ghost text with a ghost capture system (GCS) software module. The GCS module analyzes the ghost text to generate metadata. The ghost text and metadata are used by a sentiment analysis engine to apply appropriate sentiment to the ghost text. The sentiment and ghost text are routed to a customer service representative (CSR). This provides the customer service agent with additional detail and information about a customer's emotions during a text chat conversation, allowing the CSR to determine a court of interaction not only based on the customer's response, but also based on the ghost text and the sentiment from the ghost text.

18 Claims, 5 Drawing Sheets

(56) References Cited

U.S. PATENT DOCUMENTS

| | | | | |
|---|---|---|---|---|
| 2006/0285665 | A1* | 12/2006 | Wasserblat | G06Q 20/4016 379/114.14 |
| 2008/0209229 | A1* | 8/2008 | Ramakrishnan | G06F 16/437 713/186 |
| 2009/0002178 | A1* | 1/2009 | Guday | G06F 3/0346 340/573.1 |
| 2009/0076795 | A1* | 3/2009 | Bangalore | G06F 40/30 704/9 |
| 2011/0206198 | A1* | 8/2011 | Freedman | H04M 3/51 379/265.03 |
| 2011/0207100 | A1* | 8/2011 | Brokken | G06F 3/011 434/236 |
| 2012/0295718 | A1* | 11/2012 | Paquet | A63F 13/86 463/43 |
| 2014/0074945 | A1* | 3/2014 | Kanevsky | H04L 51/12 709/206 |
| 2014/0137191 | A1* | 5/2014 | Goldsmith | G06F 21/32 726/3 |
| 2014/0269446 | A1* | 9/2014 | Lum | H04L 9/0819 370/259 |
| 2015/0003595 | A1* | 1/2015 | Yaghi | H04M 3/5175 379/85 |
| 2015/0106078 | A1* | 4/2015 | Chang | G06F 16/35 704/9 |
| 2015/0195406 | A1* | 7/2015 | Dwyer | H04M 3/5191 379/265.07 |
| 2015/0205573 | A1* | 7/2015 | Kaplan | G06F 3/0482 700/94 |
| 2015/0213800 | A1* | 7/2015 | Krishnan | G10L 25/63 704/246 |
| 2015/0255066 | A1* | 9/2015 | Wilder | G10L 25/57 704/235 |
| 2015/0256675 | A1* | 9/2015 | Sri | H04L 12/1827 379/265.09 |
| 2015/0286928 | A1* | 10/2015 | Demiralp | H04L 67/10 706/61 |
| 2015/0371341 | A1* | 12/2015 | Iyer | H04L 51/32 705/319 |
| 2016/0063874 | A1* | 3/2016 | Czerwinski | G06F 40/166 434/236 |
| 2016/0133147 | A1* | 5/2016 | Deane | G09B 7/02 434/353 |
| 2016/0253552 | A1* | 9/2016 | Rihn | H04M 1/72569 382/224 |
| 2016/0337281 | A1* | 11/2016 | Breedvelt-Schouten | G06Q 10/107 |
| 2017/0046496 | A1* | 2/2017 | Johnstone | G06Q 50/01 |
| 2017/0109651 | A1* | 4/2017 | Bruno | G06F 40/274 |
| 2017/0147202 | A1* | 5/2017 | Donohue | G06F 3/04886 |
| 2018/0077095 | A1* | 3/2018 | Deyle | G06F 40/30 |
| 2018/0349583 | A1* | 12/2018 | Turgeman | H04L 63/0861 |
| 2018/0358052 | A1* | 12/2018 | Miller | G10L 15/265 |
| 2019/0018646 | A1* | 1/2019 | Abuelsaad | G06N 5/047 |
| 2019/0180012 | A1* | 6/2019 | Barday | G06F 21/316 |
| 2019/0236249 | A1* | 8/2019 | Pavlou | G06F 16/24578 |
| 2019/0342276 | A1* | 11/2019 | Sherif | G06F 21/316 |
| 2019/0355043 | A1* | 11/2019 | Swierk | G06Q 30/0631 |
| 2019/0362713 | A1* | 11/2019 | Asi | G10L 15/1822 |
| 2020/0286603 | A1* | 9/2020 | Ajilore | G16H 20/70 |

* cited by examiner

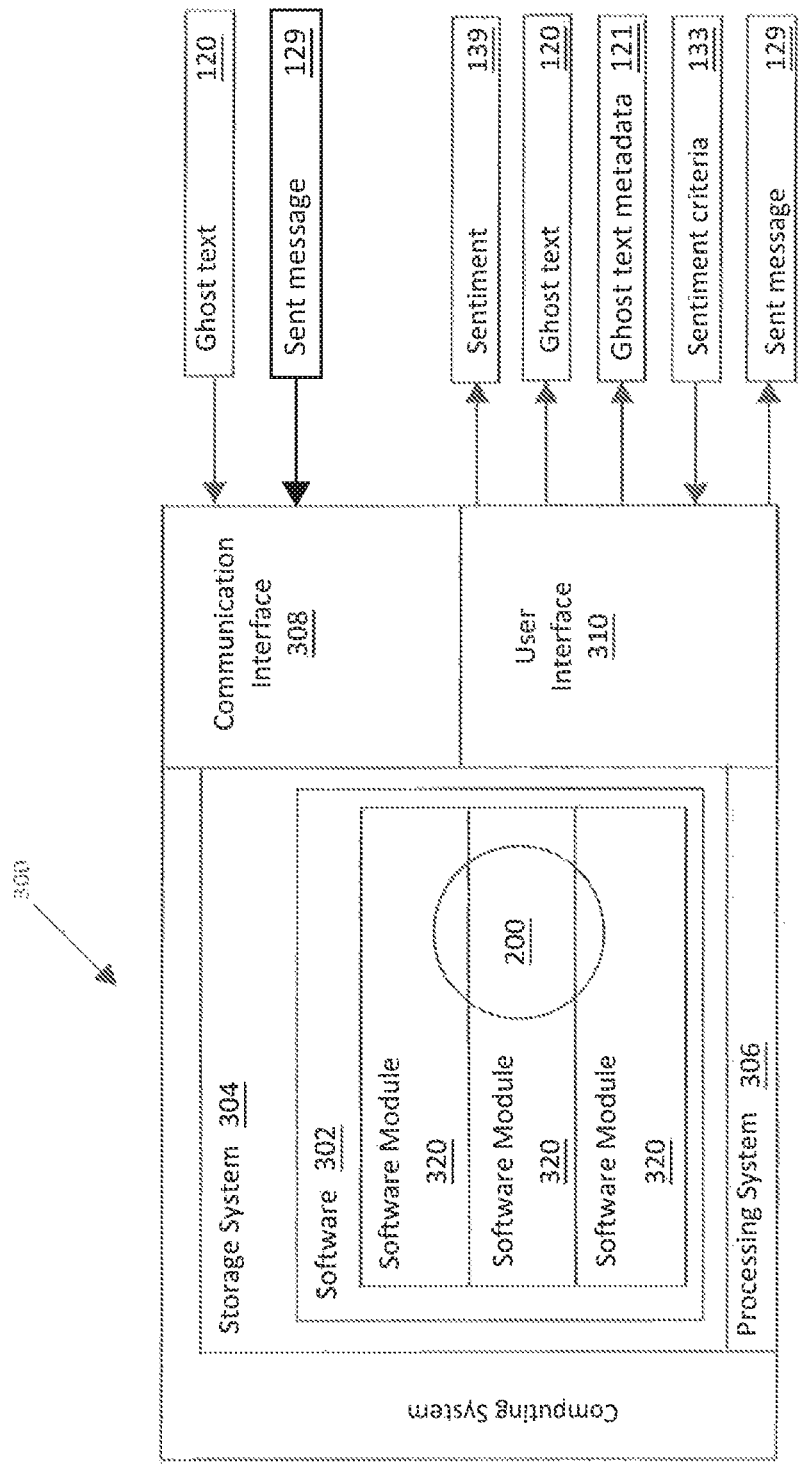

SYSTEM AND METHOD FOR SENTIMENT ANALYSIS OF CHAT GHOST TYPING

FIELD

The present disclosure is directed to a method for computer analysis. Specifically, the present disclosure is direct to a method of analyzing information captured from text chat and analyzing the sentiment of the chat text.

BACKGROUND

In modern high-volume customer engagement centers (CEC), there are a number of ways communication between a customer service representative (CSR) and a customer can take place. Communication in a CEC can take place over the phone, through email, and text chat, among other known communication methods. When talking to a customer on the phone, the CSR can detect the customer's emotions by the way in which the customer speaks, the tone of voice, and the customer's choice of words. By understanding the customer's emotions, the CSR is able to change his/her behavior or take actions in an attempt to make an upset customer happy.

Increasingly in such CECs, interactions with customers are handled through text chat or voice chat transcribed to text. In these interactions CSRs have less insight into the customer's emotions. Text analytics can provide some insight into the customer's emotions by examining the language used. However, text analytics can only analyze the text the customer chooses to send through the chat system. Valuable information such as how fast the customer types, how long the customer pauses between typing, and the text that a customer types into the chat, but deletes and never actually sends (ghost messages) is never captured and analyzed.

In general, the current method for performing sentiment analysis on chat text is to capture the entire message a customer sends. The entire message is then analyzed for sentiment and a sentiment analysis is presented to the customer service representative along with the message sent. The customer service representative might use the sentiment information to change how they interact with the customer by making a different offer, changing the words used in the interaction, or escalating the matter to a supervisor.

However, as indicated above, the sentiment of a customer can only be analyzed by the message that is actually sent. There is an unmet need to be able to capture and analyze the information a customer service representative does not normally have access to such as how fast a customer types a reply, how long the customer pauses before continuing to type, the messages a customer types, but then deletes and never sends. All of this information and ghost messages could be analyzed for sentiment and then provide a customer service representative with a better depiction of a customer's actual sentiment, rather than just the surface sentiment.

SUMMARY

The present invention allows for the capture and sentiment analysis of text the customer inputs into a chat, but never actually sends to the customer service representative (ghost text). The system captures this ghost text with a ghost capture system (GCS) software module. The GCS module analyzes the ghost text to generate metadata. The ghost text and metadata are used by a sentiment analysis engine to apply appropriate sentiment to the ghost text. The sentiment and ghost text are routed to a customer service representative (CSR). This provides the customer service agent with additional detail and information about a customer's emotions during a text chat conversation, allowing the CSR to determine a course of interaction not only based on the customer's response, but also based on the ghost text and the sentiment from the ghost text.

An embodiment of the present application is a method for capturing and analyzing ghost text for sentiment. Incoming ghost text from outside a customer engagement center (CEC) system is captured and analyzed using a ghost capture service (GCS) software module in a GCS unit. Based on the analysis of the GCS software module, the GCS software module generates ghost text metadata for the ghost text, which the GCS unit passes, along with the ghost text, to a sentiment analysis engine (SAE). The SAE performs an analysis of the ghost text using a SAE software module. Based on the analysis, the SAE assigns at least one sentiment to the ghost text. The SAE unit passes the sentiment, ghost text, and ghost text metadata to a routing engine. The routing engine determines which customer service representative (CSR) is to receive the sentiment and passes the sentiment for display on a CEC desktop.

Another embodiment of the present application is a system for capture and analysis of ghost text. The system includes a processor and a non-transitory computer readable medium programmed with computer readable code that upon execution by the processor causes the processor to execute the above-mentioned method for capture and analysis of ghost text.

Another embodiment of the present application is a non-transitory computer readable medium programmed with computer readable code that upon execution by a processor causes the processor to execute the above-mentioned method for capture and analysis of ghost text.

The objects and advantages will appear more fully from the following detailed description made in conjunction with the accompanying drawings.

BRIEF DESCRIPTION OF THE DRAWING(S)

FIG. 3 depicts an exemplary embodiment of a system for capture and sentiment analysis of ghost text.

DETAILED DESCRIPTION OF THE DRAWING(S)

Figure 1:
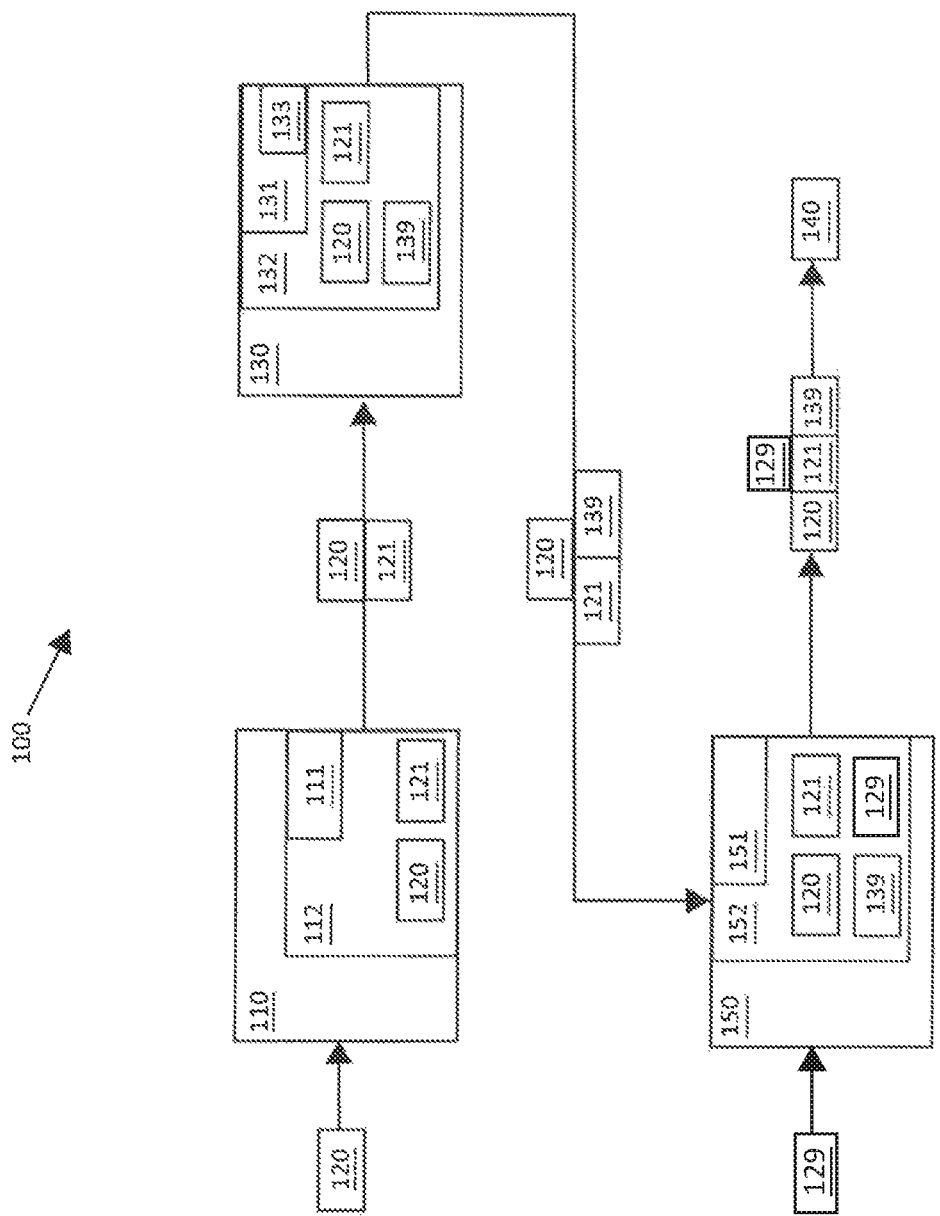
FIG. 1 depicts an exemplary embodiment of a customer engagement center system for capturing and analyzing ghost text for sentiment.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

CEC systems allow CSRs to engage with customers through a variety of manners. One of those ways is through text chat. By capturing generally unseen and unused information from a text chat system and analyzing it for customer sentiment, customer service representatives will receive better sentiment analysis and greater insight into the customer's current emotions. Some of this information may include the speed at which the customer is typing, the amount of time a customer stops typing for, the text a customer types, but then deletes and never sends. This information is typically not captured by text chat system and, is therefore never analyzed. Further, by logging and saving the text chat, ghost text, and sentiment analysis, the information can be further analyzed to determine what practices are best at changing a customer's sentiment from negative to positive or vice versa. This analysis can be used to assist customer service representative training and system learning for the future.

In embodiments, it is desirable for the system to capture and analyze all text entered by the customer, even if the customer does not actually send the information to the customer service representative. This captured text is called ghost text. This allows the system to provide the CSR with better sentiment analysis of the customer's emotions. In an embodiment, ghost text is captured after the expiration of a specific time period has elapsed. As a non-limiting example, the text written may be captured every three seconds regardless of whether the customer sends a message or not. In another embodiment, the ghost text may be captured every time a customer presses the space bar. It should be understood that these are only examples of how ghost text might be captured and should not be construed as limiting. In further embodiments, it is desirable for the system to capture and analyze the ghost text and all statistical information about the ghost text, for example, but not limited to, the speed at which the customer typed the ghost text, the time the customer paused during typing, the number of edits, deletes, or mistakes made. In another embodiment, it is desirable for the system to log the ghost text, the chat conversation, and the sentiment analysis. This permits the system to document all decisions made with regard to the ghost text and sentiment analysis received and can assist in determining what actions can cause a customer's sentiment to change from negative to positive or vice versa. In another embodiment, it is desirable to display the customer's sentiment alongside the ghost text as it occurs to provide the customer service representative with progressive updates as the representative waits for the customer's response. In another embodiment, it is desirable to provide the customer service representative with only a single sentiment analysis cumulated based off of all ghost text that occurred between sending responses.

FIG. 1 depicts an exemplary embodiment of CEC system 100 for capturing and analyzing ghost text.

CEC system 100 includes a ghost capture service (GCS) 110 having a GCS software module 111 and an optional GCS storage 112. GCS 110 may be a processor or a combination of a processing system and a storage system. GCS unit 110 captures ghost text 120 from outside the CEC system 100 and processes the information using GCS software module 111 to generate ghost text metadata 121. Ghost text 120 may be text or other information (images, pictures, etc.) input into a text chat by a customer that may or may not be transmitted by the customer to the CSR, including but not limited to, text that is typed and then deleted or changed before sending. Optionally, the GCS unit 110 may also pass a copy of ghost text and ghost text data 120 and/or ghost text metadata 121 to internal or external GCS storage 112 for permanent or temporary storage.

Ghost text metadata 121 may include, but is not limited to, the speed at which the customer types, the time the customer spends not typing, the number of edits, deletes or mistakes made prior to sending a message (not shown). By way of a non-limiting example, the ghost text may include where a customer types "this is", then pauses for 3 seconds, deletes "is", types "was", pauses for 3 more seconds, types "a waste of my time", pauses for 30 seconds, deletes "a waste of my time", types "much more helpful than I thought it would be", sends message.

CEC system 100 also includes a sentiment analysis engine (SAE) 130 having a SAE software module 131 and an optional SAE storage 132. SAE may be a processor or a combination of a processing system and a storage system. SAE 130 receives ghost text 120 with ghost text metadata 121 from GCS unit 110 and analyzes it using SAE software module 131 to determine the sentiment 139 of the ghost text 120 based on sentiment criteria 133 within the SAE software module 131. Optionally, SAE 130 may also pass a copy of ghost text 120 and/or ghost text metadata 121 to internal or external SAE storage for permanent or temporary storage. Stored ghost text 120 and/or ghost text metadata 121 may allow large-scale analysis of ghost text sentiment and trends.

Sentiment criteria 133 include rules conditioned on ghost text 120 analysis and ghost text metadata 121. Sentiment criteria 133 may be dynamically updated by a CSR or another party as any of the criteria changes. Depending on ghost text 120 analysis, ghost text metadata 121, and sentiment criteria 133, SAE will determine the sentiment 139 of the ghost text 120. By way of non-limiting example, using the example above where the customer starts to type "this was a waste of my time", but then deletes and types "this was much more helpful than I thought it would be," and then sends that message, the SAE may assign the first ghost text 120 a negative sentiment 139, whereas the second ghost text 120 (which was ultimately sent as a message 129) may get a positive sentiment 139.

CEC system 100 also includes at least one CEC desktop 140 used by the CSR for viewing messages, ghost text 120, sentiment 139, and optionally ghost text metadata 121. CEC desktop 140 may also receive input for updating sentiment criteria 133.

CEC system 100 also includes at least one routing engine 150 having a routing engine software module 151 and an optional routing engine storage 152. Routing engine 150 may be a processor or a combination of a processing system and a storage system. Routing engine unit 150 receives sent messages 129, sentiment 139, ghost text 120, and/or ghost text metadata 121 and uses routing engine software module 151 to route the sent messages 129, sentiment 139, ghost text 120, and/or ghost text metadata 121. Optionally, routing engine 150 may also pass a copy of sent messages 129, sentiment 139, ghost text 120, and/or ghost text metadata 121 to internal or external routing engine storage 152 for permanent or temporary storage. Stored sent messages 129, sentiment 139, ghost text 120, and/or ghost text metadata 121 may allow large-scale analysis of ghost text and trends.

Figure 2A:
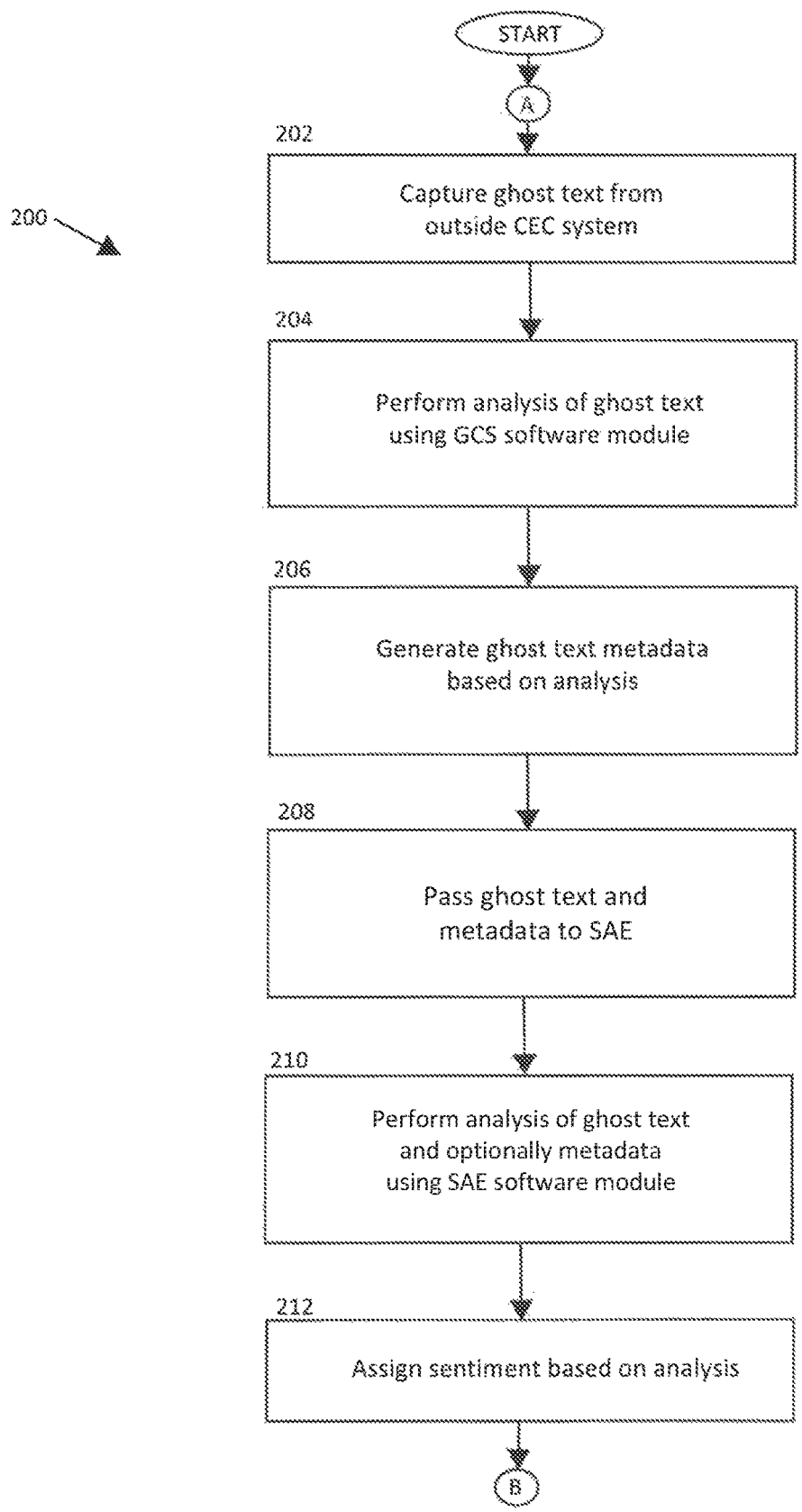
FIGS. 2a, 2b and 2c depict a flowchart of an exemplary embodiment of a method for capture and sentiment analysis of ghost text.
Figure 2B:
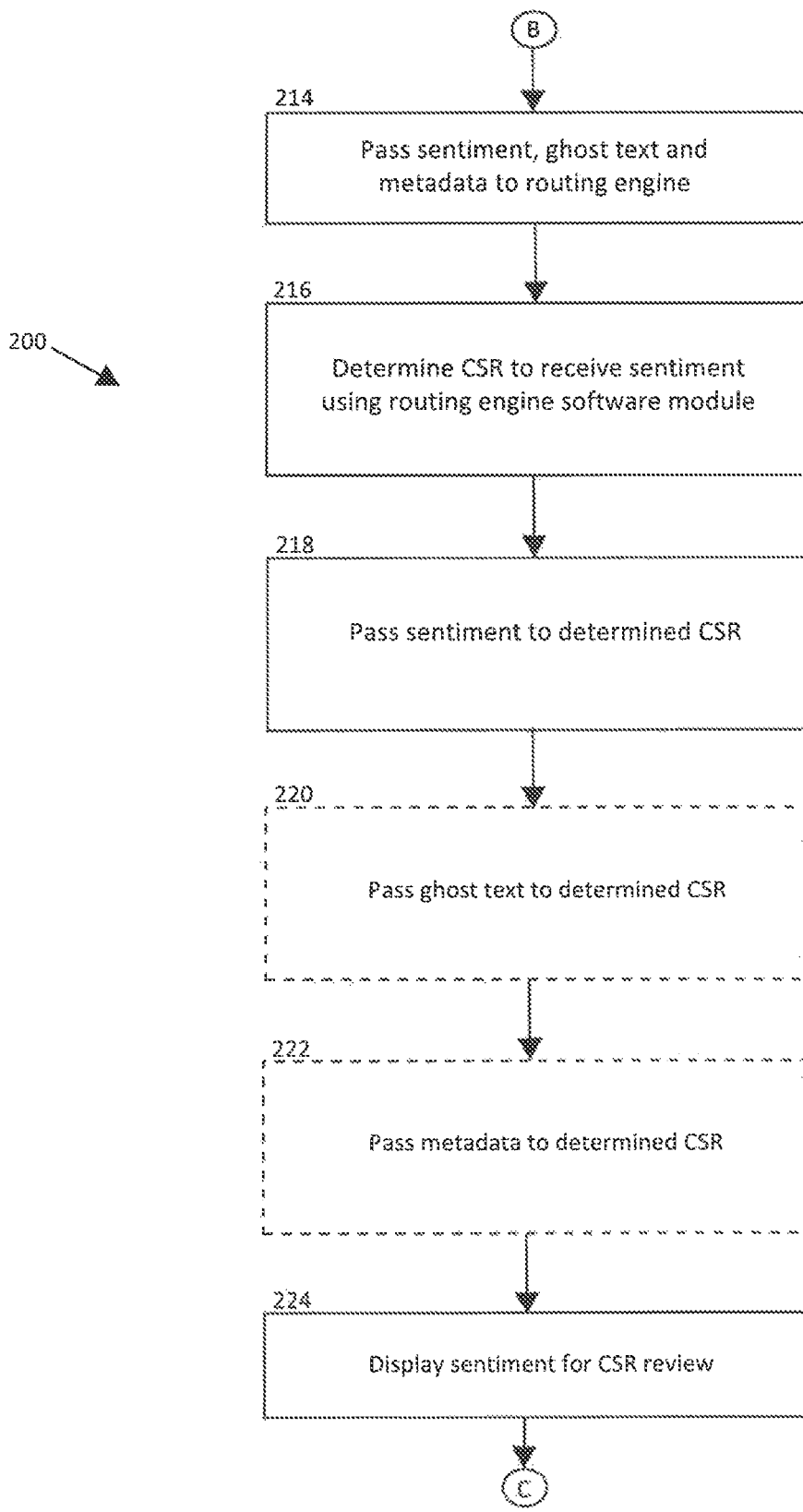
Figure 2C:
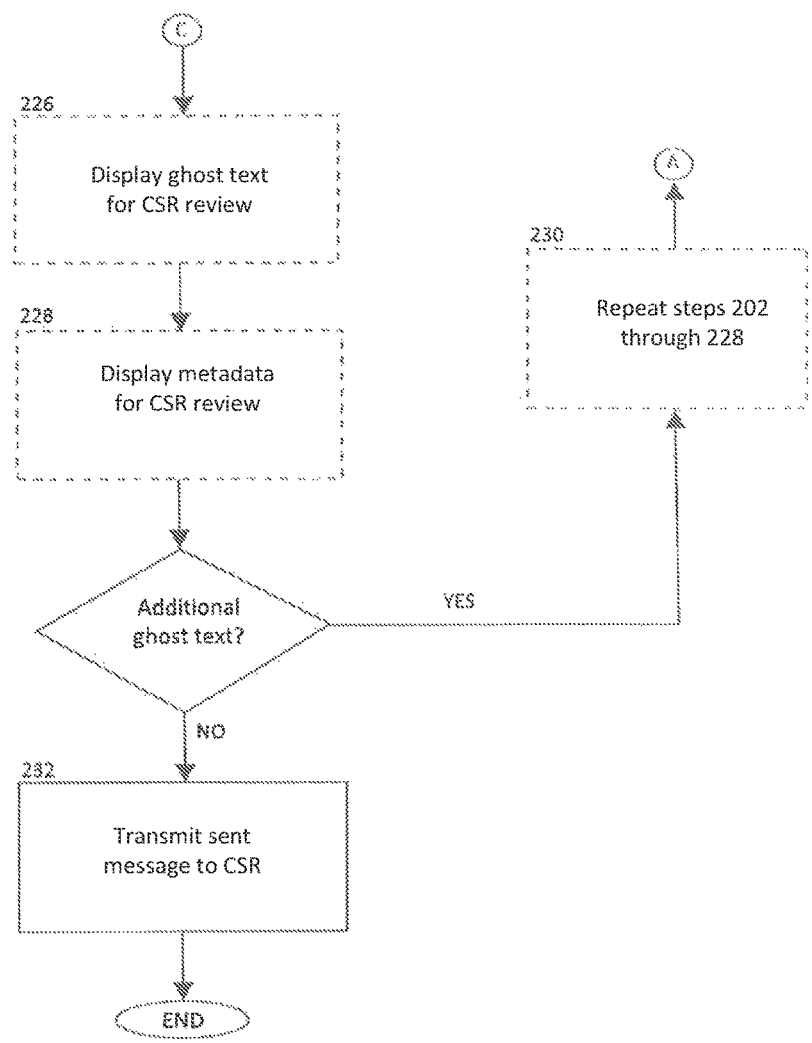

FIGS. 2a-2c depict a flowchart of an exemplary embodiment of method 200 for capture and sentiment analysis of ghost text.

Referring to FIG. 2a, in step 202, the GCS unit receives captured ghost text from outside the CEC system in a chat session. In step 204, the GCS unit performs an analysis of the captured ghost text using the GCS software module. The analysis may evaluate the captured ghost text content, existing attached metadata, header data, and images. In step 206, the GCS unit generates ghost text metadata for the captured ghost text based on the analysis of step 204. In step 208, the GCS unit passes the captured ghost text and the associated ghost text metadata to a SAE. Optionally, the GCS unit may also pass the ghost text and/or associated ghost text metadata to GCS storage. In step 210, the SAE performs an analysis of the captured ghost text and the associated ghost text metadata using a SAE software module. The analysis is based on sentiment criteria in the SAE software module. In step 212, the SAE assigns sentiment to the captured ghost text based on the analysis of step 210.

Referring to FIG. 2b, in step 214, the SAE passes the sentiment, ghost text, and optionally ghost text metadata to the routing engine for routing. Optionally the SAE may also pass the sentiment, ghost text, and ghost text metadata to SAE storage. In step 216 the routing engine determines the appropriate CSR to receive the sentiment based on the routing engine software module. In step 218 the routing engine passes the sentiment to the determined CSR from step 216. Optionally, the routing engine may also pass the sentiment, ghost text, and ghost text metadata to the routing engine storage. In optional step 220 the routing engine passes the ghost text to the determined CSR from step 216. This step may occur simultaneously with step 218. Optionally, the routing engine may also pass the ghost text to the routing engine storage. In optional step 222 the routing engine passes the ghost text metadata to the determined CSR from step 216. This step may occur simultaneously with step 218 and 220. Optionally, the routing engine may also pass the ghost text metadata to the routing engine storage. In step 224, the CEC desktop displays the sentiment for CSR review.

Referring to FIG. 2c, in optional step 226, the CEC desktop displays the ghost text for CSR review. In certain embodiments, the step may occur simultaneously with step 224 or before step 224. In optional step 228, the CEC desktop displays the ghost text metadata for CSR review. In certain embodiments, the step may occur simultaneously with steps 224 and 226 or before steps 224 and 226. In optional step 230, the CEC system repeats steps 202 through 228 to continue capturing and analyzing ghost text. This allows the CSR to be provided with ghost text and analysis thereof until no ghost text remains. In step 232, the CEC system transmits a sent message from the customer to the CSR.

FIG. 3 depicts an exemplary embodiment of a system 300 for capturing and analyzing ghost text.

System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes three software modules 320 for performing the functions of GCS software module 111, SAE software module 121, and routing engine software module 151. Although computing system 300 as depicted in FIG. 3 includes three software modules 320 in the present example, it should be understood that one or more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

User interface 310 can include one or more CEC desktops 140, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display ghost text 120, ghost text metadata 121, messages 129, sentiment 139, CEC desktop 140, or another interface further associated with embodiments of the system and method as disclosed herein. Speakers, printers, haptic devices and other types of output devices may also be included in the user interface 310. A CSR or other staff can communicate with computing system 300 through the user interface 310 in order to view ghost text 120, ghost text metadata 121, sent messages 129, sentiment 139, update sentiment criteria 133, enter client input, manage an interaction, or any number of other tasks the CSR or other staff may want to complete with computing system 300.

As described in further detail herein, computing system 300 receives and transmits data through communication interface 308. In embodiments, the communication interface 308 operates to send and/or receive data, such as, but not limited to, ghost text 120, ghost text metadata 121, messages 129, sentiment 139 to/from other devices and/or systems to which computing system 300 is communicatively connected, and to receive and process client input, as described in greater detail above. The client input can include ghost text 120, ghost text metadata 121, messages 129, sentiment 139, details about a request, work order or other set of information that will necessitate an interaction between the client and the representative. Client input may also be made directly to the CSR, as described in further detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for capturing and analyzing ghost text, comprising:
    capturing a ghost text from outside a customer engagement center (CEC) system, wherein the ghost text is text entered by a customer from outside the CEC system and not sent;
    performing an analysis of the ghost text using a ghost capture service (GCS) software module on a GCS unit;
    generating ghost text metadata for the captured ghost text based on the analysis of the GCS software module;
    passing the ghost text and the ghost text metadata to a sentiment analysis engine (SAE);
    performing an analysis of the ghost text using a SAE software module based on at least one sentiment criteria;
    assigning at least one sentiment to the ghost text based on the analysis of the SAE software module;
    passing the at least one sentiment to a routing engine;
    passing the ghost text to the routing engine;
    passing the ghost text metadata to the routing engine
    determining, with a routing engine software module, at least one customer service representative (CSR) to receive the at least one sentiment based on the determination of the routing engine software module;
    passing the at least one sentiment to the at least one customer service representative (CSR) determined to receive the sentiment; and
    displaying the sentiment on a CEC desktop.

2. The method of claim 1, further comprising repeating the method of claim 1 until no further ghost text remains to be captured.

3. The method of claim 1, further comprising the GCS unit passing a copy of the ghost text and the ghost text metadata to a GCS storage.

4. The method of claim 1, further comprising the SAE passing a copy of the ghost text, the ghost text metadata, and the at least one sentiment to a SAE storage.

5. The method of claim 1, further comprising the routing engine unit passing a copy of the ghost text, the ghost text metadata, the at least one sentiment, and the CSR determined to receive the sentiment to a routing engine storage.

6. The method of claim 1 further comprising the SAE receiving an update to at least one sentiment criteria.

7. The method of claim 1, wherein the analysis performed by the SAE software module analyzes the ghost text and the ghost text metadata to assign at least one sentiment to the ghost text.

8. The method of claim 7, wherein the routing engine passes the ghost text to the at least one CSR determined to receive the sentiment.

9. The method of claim 8, wherein the CEC desktop displays the ghost text on the CEC desktop.

10. The method of claim 8, wherein the CEC desktop displays the ghost text simultaneously with the sentiment.

11. The method of claim method of claim 8, wherein the routing engine passes the ghost text metadata to the at least one CSR determined to receive the sentiment.

12. The method of claim 1, wherein the CEC desktop displays the ghost text metadata on the CEC desktop.

13. The method of claim 12, wherein the CEC desktop displays the ghost text metadata, the ghost text, and the sentiment simultaneously on the CEC desktop.

14. A system for capturing and analyzing ghost text for sentiment, comprising:
    a processor, and
    a non-transitory computer readable medium programmed with computer readable code that upon execution by the processor causes the processor to:
        capture a ghost text from outside a CEC system, wherein the ghost text is text entered by a customer, but not sent,
        perform an analysis of the ghost text using a GCS software module on a GCS unit,
        generate ghost text metadata for the ghost text based on the analysis of the GCS software module,
        pass the ghost text and the ghost text metadata to a SAE,
        perform an analysis of the ghost text using a SAE software module based on at least one sentiment criteria,
        assign at least one sentiment to the ghost text based on the analysis of the SAE software module,
        pass the ghost text, the ghost text metadata, and the at least one sentiment to a routing engine,
        determine at least one CSR to receive the at least one sentiment, ghost text, and ghost text metadata based on the determination of a routing engine software module,
        pass the at least one sentiment, ghost text, and ghost text metadata to the at least one CSR determined to receive the sentiment, and
        display the at least one sentiment, ghost text, and ghost text metadata on a CEC desktop.

15. The system of claim 14, wherein the SAE software module is programmed to analyze the ghost text and the ghost text metadata to determine the sentiment.

16. The system of claim 14, wherein the ghost text metadata is at least one of the speed at which the customer typed the ghost text, the time the customer spent not actively typing the ghost text, the number of edits, deletes or mistakes made prior to capturing the ghost text, the tone of the ghost text, or the intent or meaning of the ghost text.

17. The system of claim 14, wherein the sentiment criteria are updatable.

18. A non-transitory computer readable medium programmed with computer readable code that upon execution by a processor causes the processor to:
    capture a ghost text from outside a CEC system, wherein the ghost text is text entered by a customer, but not sent,
    perform an analysis of the ghost text using a GCS software module on a GCS unit,
    generate ghost text metadata for the ghost text based on the analysis of the GCS software module,
    pass the ghost text and the ghost text metadata to a SAE,
    perform an analysis of the ghost text using a SAE software module based on at least one sentiment criteria, assign at least one sentiment to the ghost text based on the analysis of the SAE software module, pass the ghost text, the ghost text metadata, and the at least one sentiment to a routing engine, determine at least one CSR to receive the at least one sentiment, ghost text, and ghost text metadata based on the determination of a routing engine software module, pass the at least one sentiment, ghost text, and ghost text metadata to the at least one CSR determined to receive the sentiment, and display the at least one sentiment, ghost text, and ghost text metadata on a CEC desktop.

\* \* \* \* \*